(12) United States Patent
Bader

(10) Patent No.: US 7,417,338 B2
(45) Date of Patent: Aug. 26, 2008

(54) DISCONNECTING DEVICE FOR COMMUNICATIONS CONNECTIONS

(76) Inventor: Unal Bader, Im Ganswasen 104, D-73669 Lichtenwald (DE)

( * ) Notice: Subject to any disclaimer, the term of this patent is extended or adjusted under 35 U.S.C. 154(b) by 0 days.

(21) Appl. No.: 10/508,880

(22) PCT Filed: Mar. 19, 2003

(86) PCT No.: PCT/DE03/00900

§ 371 (c)(1),
(2), (4) Date: Apr. 6, 2005

(87) PCT Pub. No.: WO03/081396

PCT Pub. Date: Oct. 2, 2003

(65) Prior Publication Data

US 2005/0225915 A1    Oct. 13, 2005

(30) Foreign Application Priority Data

Mar. 26, 2002  (DE) ................. 102 13 351

(51) Int. Cl.
*H01H 35/00*  (2006.01)
*H01H 47/00*  (2006.01)
*H01H 83/00*  (2006.01)
*H02B 1/24*  (2006.01)
*H02H 3/00*  (2006.01)

(52) U.S. Cl. .................. 307/130; 307/140; 439/638

(58) Field of Classification Search ............... 307/130, 307/140; 439/502, 638; 713/300
See application file for complete search history.

(56) References Cited

U.S. PATENT DOCUMENTS

| 5,491,721 A | * | 2/1996 | Cornelius et al. | ............ 375/222 |
| 6,501,195 B1 | * | 12/2002 | Barton | ............ 307/125 |
| 6,961,856 B1 | * | 11/2005 | Kouropoulus | ................ 726/36 |

FOREIGN PATENT DOCUMENTS

| JP | 2000010887 | 1/2000 |
| WO | WO 03/010627 A2 | 2/2003 |
| WO | WO 03/081396 A1 | 10/2003 |

OTHER PUBLICATIONS

Mason, Research Disclosure, 428, 1699 (Dec. 1999).

* cited by examiner

*Primary Examiner*—Michael J Sherry
*Assistant Examiner*—Carlos Amaya
(74) *Attorney, Agent, or Firm*—Leydig, Voit & Mayer, Ltd.

(57) ABSTRACT

A switching arrangement is connected between a PC and a communications line. The switching arrangement is controlled by a power supply voltage in the PC that can be accessed externally. When the PC switched off, this supply voltage disappears and the device in the communications line goes into a blocked state. This makes it possible to completely disconnect the PC from the communications line without conducting any operations in the PC, even if the communications card or the modem wants to maintain a constant connection with the outside world.

15 Claims, 3 Drawing Sheets

DISCONNECTING DEVICE FOR COMMUNICATIONS CONNECTIONS

FIELD OF THE INVENTION

The invention relates to a switching arrangement for disconnecting a communications line between a computer and a remote data source.

BACKGROUND OF INVENTION

If the user of a PC wants to access the intranet, he needs a modem in his personal computer (PC). The modem allows the connection of the PC to a telephone or ISDN line, which constitutes the communications connection with a remote communications computer.

Definite connections should always exist or should be activated as needed. So that electrical current is not used unnecessarily in spite of these requirements, a sleep mode is provided for modern PCs, into which the PC is practically completely shut off, few device groups. However, the PC can be remotely turned on again by means of a wake-up signal.

This output characteristic is always present in the PC and means that the PC, which from the standpoint of the user is turned off, can actually always be remotely switched on, unless the user operates a mechanical network switch.

Modern PCs as a rule no longer have the classic arrangement of a switch connected with the electric power supply for disconnecting the device completely from the current supply. Instead, the power units of the PCs are continuously connected with the power supply and are activated and deactivated by means of semiconductor switches. The energy required for the activation and deactivation is also taken from the power supply. As a result, it becomes possible, as mentioned above, to switch the PC on or off for example, the electronic switch for the operational status of the power unit can be controlled by means of the modem. The modem itself receives its power via a different path, so that it is continuously switched on independently of the PC.

A PC can also be attacked via the telecommunications lines. Such attacks often occur when it can be assumed that the user cannot monitor his PC.

OBJECTS AND BRIEF SUMMARY OF THE INVENTION

In view of the foregoing, an object of the invention is to create a switching arrangement which is capable of interrupting the communications connection to the computer, so that remote switching-on of the computer is no longer possible.

A switching arrangement in accordance with the invention has an at least single-pole PC connector as well as an at least single-pole remote connector, so that the switching arrangement can be switched into a data link between the PC and a remotely located data source with the aid of these two connectors. A disconnecting device is located in the switching arrangement and has two switching states. In the first switching state, the data connection between the two connectors is established, while the data connection is disconnected in the second state.

A control connector of the disconnecting device is operable to switch the disconnecting device between the two switching states. The control connector is adapted to connect with a supply voltage of the PC, which is actually shut off in the sleep mode of the PC and is activated only after the PC is completely switch-on.

If the user employs such a switching arrangement and turns off his computer by means of the control knob for the power unit, the control voltage for the disconnecting device disappears. The disconnecting device then transitions into the switching state in which the data connection is disconnected. Remotely or externally originated wake-up signals for the PC can no longer reach the PC and switch it on. If the user himself switches the PC on, an appropriate supply voltage is available, which is capable of switching the disconnecting device over into the first switching state. At that point the PC is connected with the data line.

The switching arrangement in accordance with the invention can be implemented in the PC itself or can be contained in a separate housing connectable with the PC by means of a plug connector.

The at least one-pole PC connector usefully consists of a telecommunications connector of the same standard as is used in the PC. This can be an analog connector, as well as an ISDN connector.

The same also applies for the outgoing, remote connector, which is also usefully provided with a plug connector such as originally provided in the PC.

So that the data transmission takes place without problems in both directions, and so that no ground connection problems can occur, the electrical switching arrangement advantageously consists of at least one relay, which is appropriately designed with multiple poles.

In order to eliminate the need for additional plug connectors on the PC, the control connector of the switching arrangement of the present invention is advantageously equipped with two plug connectors. These two plug connectors can be switched into a connecting line with another peripheral device. Examples of such peripheral devices are the mouse, the keyboard, the printer and the like. A USB connector is also possible. It is sufficient if the corresponding connector additionally provides a supply voltage to the peripheral device and this supply voltage is also switched off in the sleep mode of the PC.

The connections are particularly simple if the housing has appropriate plug sockets, for example RJ-45 plug sockets, at both ends, and the plug connector is equipped as a double plug connector with a plug or socket for looping through a connection of a peripheral device.

DETAILED DESCRIPTION OF THE INVENTION

Figure 1:
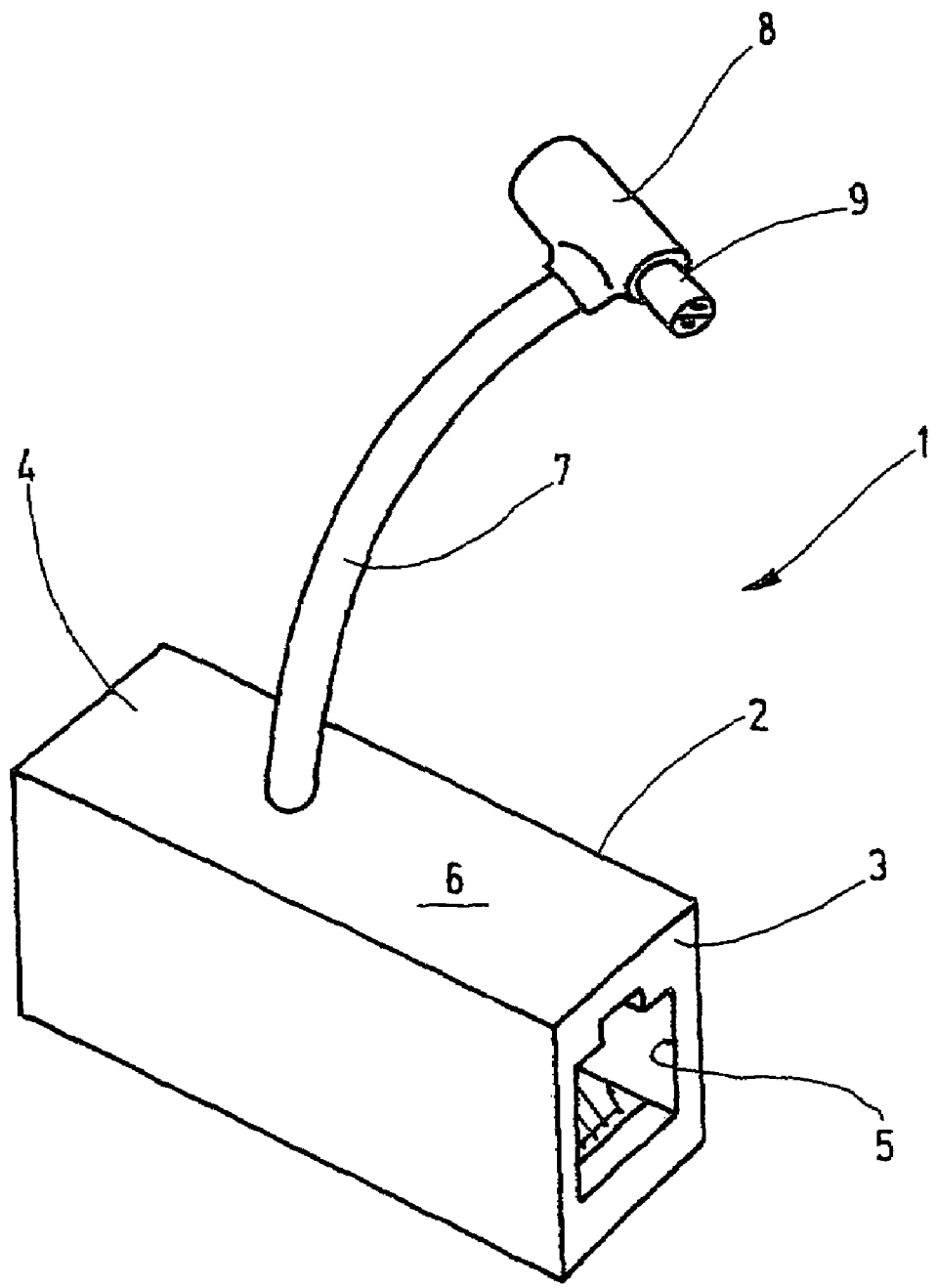
FIG. 1 is a perspective view of a device for disconnecting a communications line from a PC in accordance with the present invention.

A device 1 in accordance with the invention for disconnecting a data connection is illustrated in FIG. 1. The device 1 includes an approximately cube-shaped housing 2 with two oppositely located ends 3 and 4. A plug connector 5 is housed in each one of the two ends 3 and 4. Because of the perspective illustration only the plug connector 5a in the front end 3 can be seen in FIG. 1. The plug connector in the front end 4 is embodied in the same way. The two plug connectors are RJ-45 plug sockets with an 8-pole design. Such plug sockets are also known as Western plug sockets.

A control cable 7 extends from a substantially flat top 6 and leads to a further plug connector arrangement 8. On the side facing outward in FIG. 1, the plug connector arrangement 8 is provided with a plug 9 which is complementary to the plug sockets provided on a PC for connecting a mouse, keyboard or the like. The opposite side of the housing of the plug connector arrangement 8 has a plug socket, which is complementary to the plug 9 shown.

Figure 2:
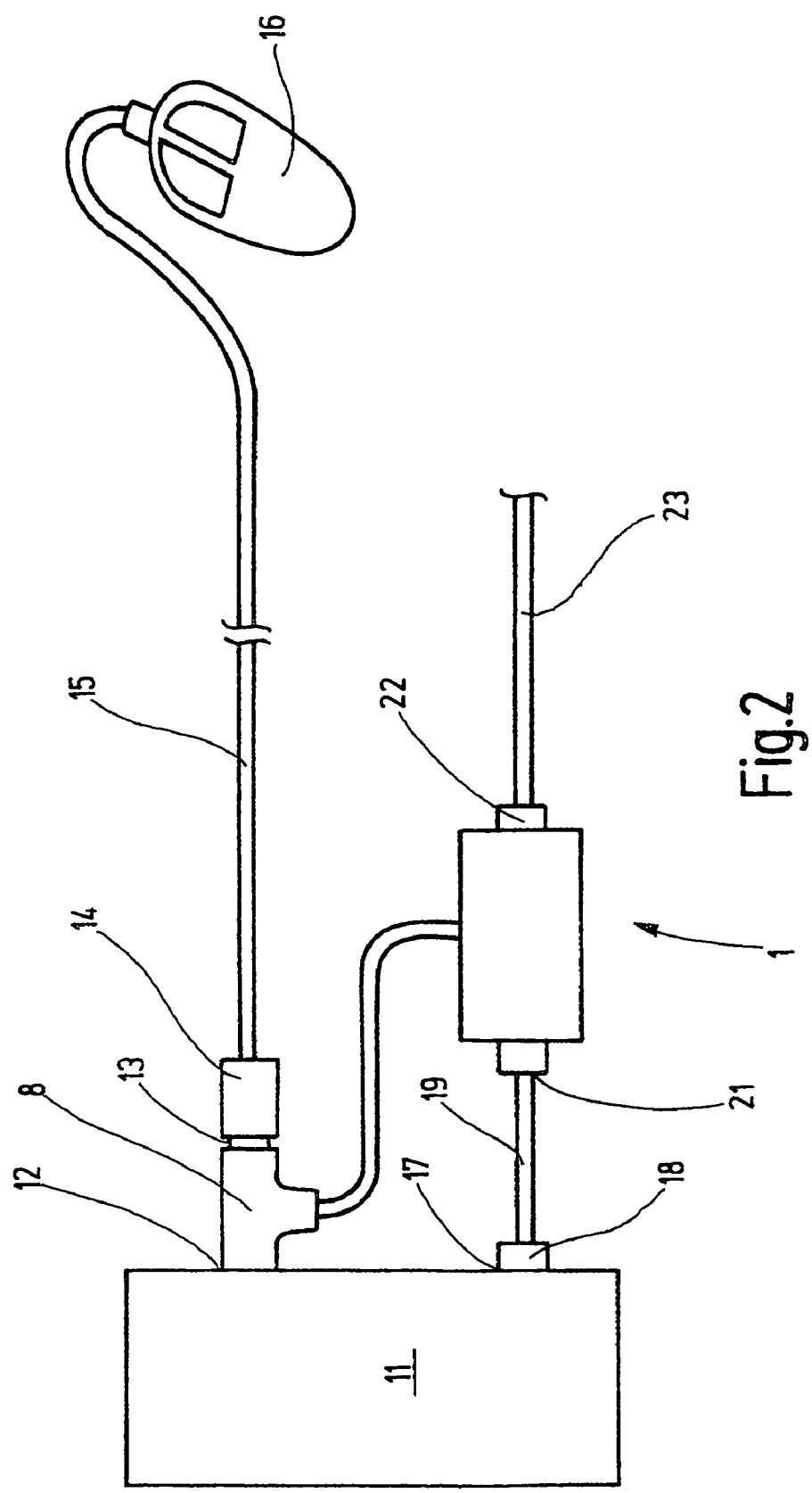
FIG. 2 is a schematic diagram illustrating the use of the device of FIG. 1.

As shown in FIG. 2, the device 1 of the present the invention is connected to a PC 11. The PC 11 has a plug socket 12, into which the plug 9 of the plug arrangement 8 is inserted. A plug 14 of a cable 15, which connects the plug 14 with a computer mouse 16, is inserted into the plug socket 13 arranged on the side of the plug arrangement 8 located opposite the plug 9.

The PC 11 has a further RJ-45 plug socket 17, into which an RJ-45 plug 18 has been inserted. One of the two plug connectors 5 of the device 1 is connected with the PC 11 via a connecting cable 19 with a further RJ-45 plug 21 connected to the cable. A further RJ-45 plug 22 has been inserted into the other plug connector 5 and is connected to a line 23 leading away from the PC 11. The line 23 terminates, for example, at an $S_0$ bus of an ISDN line leading to a switching center.

Figure 3:
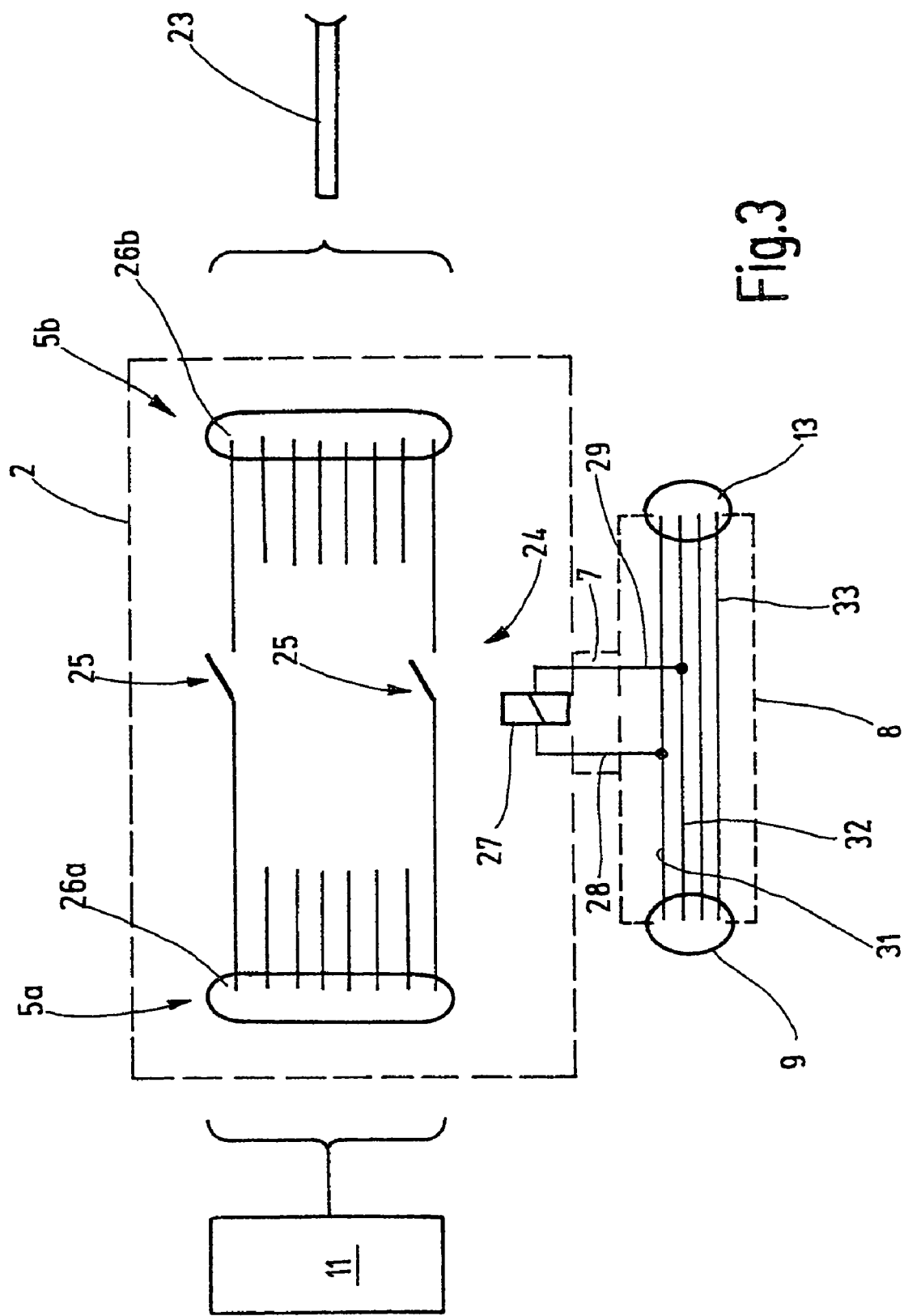
FIG. 3 is a schematic wiring diagram illustrating the electrical structure of the device of FIG. 1.

As shown in FIG. 3, a relay 24 with a total of 8 poles is located in the housing 2. Each switch set 25 of the relay 24 connects one pole 26 of the one RJ-45 plug connector 5a with the corresponding pole 26b of the other RJ-45 plug connector 5b.

The circuit diagram in FIG. 3 is highly schematic. Only two switch sets 25 are shown in FIG. 3 and the remaining connecting lines between the two connectors 5a, 5b are only partially shown.

A relay winding 27 is part of the relay 24 and is connected via the control cable 7, which contains two lines 28 and 29, to the two lines 31 and 32 and connect the two poles of the plug 9 with the corresponding poles of the plug socket 13. These are the poles through which the computer mouse 16 or a connected keyboard receives supply voltage from the PC 11.

The functioning of the arrangement of the invention is as follows:

When the PC 11 is switched off, the PC 11 does not provide a supply voltage to the computer mouse 16. As a result, the two connecting lines 31 and 32 are without voltage, so that the relay winding 27 is also not provided with voltage. The relay 24 is in its rest state. Since the switch sets 25 are working contacts that are normally open, they are in their open rest position. In this position there is no electrical connection between any one of the poles 26a of the connector 5a and one of the poles 26b of the connector 5b. The data connection between the communications line 23 and the appropriate plug 17 at the PC 11 is electrically interrupted. Signals arriving via the communications line 23 cannot be forwarded to the PC 11. It is not possible to remotely switch the PC 11 out of its sleep mode into the fully switched-on state.

As soon as the user switches the PC 11 on, the PC 11 provides a supply voltage to the computer mouse 16. This voltage is carried in the lines 31 and 32, to which the relay winding 27 lies parallel. As a result, the relay 24 engages and brings the contact sets 25 into the switched-on or engaged position. Now, each of the poles 26a is connected with a corresponding pole 26b of the other plug connector 5b.

Because the computer mouse 16 is also connected to plug socket 13, it is supplied with current in the same way as is the case when the plug 14 is directly engaged with the plug socket 12. Furthermore, all lines which otherwise connect the computer mouse 16 with the PC 11 are looped in an unchanged manner through the plug arrangement 8. Appropriate connecting lines 33 are provided.

The use of a relay sees to it that no electrical connection is made between the plug socket 12 for the computer mouse 16 and the plug 17, to which the communications line 23 is normally directly connected. Because of the use of the inventive arrangement, the d.c. voltage relations in comparison with the direct connection of the computer mouse 15, or the communications line 23, with the PC 11 do not change.

The use of the relay 24 also has the advantage that the electrical connection between the two RJ-45 connectors 5a and 5b is independent of the direction or potential. The user is not forced to assure that the device of the present invention is only switched in a defined manner between the plug 17 and the communication line 23. The ohmic connection between the two connectors 5a and 5b allows the flow of current in both directions.

For one skilled in the art it also follows from the illustrated embodiment that semiconductor switches can be used in place of the relay 24, or Reed contacts as well as optical couplers. Depending on the requirements, the optical couplers can be switched bidirectionally or unidirectionally, and it is also possible to control the data connection between the two sockets potential-free by means of the supply voltage on the lines 31 and 32. Such modifications are also considered to be part of the present invention. Since one skilled in the art knows how to appropriately modify the circuit, it is not necessary to cite a further exemplary embodiment for explanation.

A switching arrangement is connected between a PC and a communications line. The switching arrangement is controlled by a supply voltage accessible remotely or externally from the PC. With the PC switched off, this supply voltage disappears and the device in the communications line switches into a blocking mode. In this way it is possible to completely disconnect the PC from the communications line without intervention at the PC, even if the communications card or the modem wants to maintain a constant connection with the outside world.

The invention claimed is:

1. A switching arrangement for disconnecting a communications line connecting a computer to a remote data source, the switching arrangement comprising:
    a PC connector for connecting with the computer, the PC connector having at least a single-pole;
    a remote connector for connecting with the remote data source, the remote connector having at least a single-pole;
    an electrical switching device located between the PC connector and the remote connector, the electrical switching device having a first switching state wherein a data connection exists between the PC connector and the remote connector and a second switching state wherein the data connection between the PC connector and the remote connector is interrupted; and
    a control connector for connecting to and receiving a supply voltage provided by the computer for powering peripheral devices, the control connector being operable to bring the switching device into the first switching state when the computer supply voltage is present and to bring the switching device into the second state when the computer supply voltage is absent.

2. The switching arrangement according to claim 1, wherein the PC connector is a telecommunications connector.

3. The switching arrangement according to claim 1, wherein the PC connector is an ISDN connector for telecommunications lines.

4. The switching arrangement according to claim 1, wherein the remote connector is a telecommunications connector.

5. The switching arrangement according to claim 1, wherein the remote connector is an ISDN connector.

6. The switching arrangement according to claim 1, wherein the electrical switching device comprises a relay having least a single-pole.

7. The switching arrangement according to claim 1, wherein the electrical switching device is such that it is in the second switching state when the supply voltage or a signal is absent at the control connector.

8. The switching arrangement according to claim 1, wherein the switching device includes a switching system for each pole.

9. The switching arrangement according to claim 1, wherein the control connector includes a first plug connector which is adapted to be plugged together with a second plug connector which is accessible from outside of the computer.

10. The switching arrangement according to claim 9, wherein the second plug connector is electrically connected with a third plug connector such that a lead to a computer peripheral device can be looped via the second and third plug connectors.

11. The switching arrangement according to claim 10, wherein at least one of the second and third plug connectors is designed as a plug connector for connecting a keyboard.

12. The switching arrangement according to claim 10, wherein at least one of the second and third plug connectors is designed as a plug connector for connecting a computer mouse.

13. The switching arrangement according to claim 10, wherein at least one of the second and third plug connectors is designed as a plug connector for connecting a USB device.

14. The switching arrangement according to claim 1, further including a housing for the switching arrangement, the housing including the PC connector and the remote connector which are identically configured.

15. The switching arrangement according to claim 14, wherein the PC connector and the remote connector are PJ-45 connectors.

* * * * *